United States Patent
Lin

(10) Patent No.: US 10,569,361 B2
(45) Date of Patent: Feb. 25, 2020

(54) LASER POWDER DEPOSITION WELD REWORK FOR GAS TURBINE ENGINE NON-FUSION WELDABLE NICKEL CASTINGS

(71) Applicant: UNITED TECHNOLOGIES CORPORATION, Farmington, CT (US)

(72) Inventor: Wangen Lin, S. Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 652 days.

(21) Appl. No.: 15/032,415

(22) PCT Filed: Sep. 16, 2014

(86) PCT No.: PCT/US2014/055742
§ 371 (c)(1),
(2) Date: Apr. 27, 2016

(87) PCT Pub. No.: WO2015/065606
PCT Pub. Date: May 7, 2015

(65) Prior Publication Data
US 2016/0271731 A1 Sep. 22, 2016

Related U.S. Application Data

(60) Provisional application No. 61/897,623, filed on Oct. 30, 2013.

(51) Int. Cl.
*B23K 26/342* (2014.01)
*F01D 5/00* (2006.01)
(Continued)

(52) U.S. Cl.
CPC ............ *B23K 26/342* (2015.10); *B22F 5/009* (2013.01); *B22F 7/062* (2013.01); *B23K 26/144* (2015.10);
(Continued)

(58) Field of Classification Search
CPC ............................. C22C 19/00; B23K 20/021
(Continued)

(56) References Cited

U.S. PATENT DOCUMENTS 4,726,104 A 2/1988 Foster et al.
5,071,054 A * 12/1991 Dzugan ................ B23K 20/021
228/119
(Continued)

FOREIGN PATENT DOCUMENTS

DE 10005874 A1 * 8/2001 ............... B23K 9/00
JP S63149076 A 6/1988
(Continued)

OTHER PUBLICATIONS

JP Office Action dated Mar. 23, 2017 issued in corresponding Application No. JPA 2016-526126.
(Continued)

*Primary Examiner* — Khanh T Nguyen
(74) *Attorney, Agent, or Firm* — Bachman & LaPointe, P.C.

(57) ABSTRACT

A method of reworking or repairing a component includes removing a casting defect from a component manufactured of a non-fusion weldable base alloy to form a cavity that results in a through hole; sealing the through hole with a backing; and at least partially filling the cavity with a multiple of layers of a multiple of laser powder deposition spots, each of the multiple of laser powder deposition spots formed of a filler alloy, a first layer of the multiple of layers
(Continued)

includes a perimeter of the multiple of laser powder deposition spots that overlap a wall of the cavity and the backing.

17 Claims, 8 Drawing Sheets

(51) Int. Cl.
*F01D 9/04* (2006.01)
*B23P 6/00* (2006.01)
*B23K 26/32* (2014.01)
*B22F 5/00* (2006.01)
*B22F 7/06* (2006.01)
*B23K 26/144* (2014.01)
*F01D 25/24* (2006.01)
*B23K 101/00* (2006.01)
*C21D 9/50* (2006.01)
*B23K 103/08* (2006.01)
*C22C 19/05* (2006.01)

(52) U.S. Cl.
CPC .............. *B23K 26/32* (2013.01); *B23P 6/007* (2013.01); *F01D 5/005* (2013.01); *F01D 9/041* (2013.01); *F01D 25/24* (2013.01); *B22F 2007/068* (2013.01); *B22F 2999/00* (2013.01); *B23K 2101/001* (2018.08); *B23K 2103/08* (2018.08); *C21D 9/50* (2013.01); *C22C 19/057* (2013.01); *F05D 2220/32* (2013.01); *F05D 2230/10* (2013.01); *F05D 2230/21* (2013.01); *F05D 2230/31* (2013.01); *F05D 2230/80* (2013.01); *F05D 2300/17* (2013.01); *F05D 2300/175* (2013.01); *F05D 2300/177* (2013.01)

(58) Field of Classification Search
USPC .......................................... 148/527; 228/119
See application file for complete search history.

(56) References Cited

U.S. PATENT DOCUMENTS

| | | | |
|---|---|---|---|
| 5,284,290 A | 2/1994 | Moore et al. | |
| 5,405,272 A | 4/1995 | Rapoza | |
| 6,000,601 A | 12/1999 | Walak | |
| 6,046,426 A | 4/2000 | Jeantette et al. | |
| 6,110,199 A | 8/2000 | Walak | |
| 6,143,378 A | 11/2000 | Harwell et al. | |
| 6,379,392 B1 | 4/2002 | Walak | |
| 6,429,402 B1 | 8/2002 | Dixon et al. | |
| 6,463,349 B2 | 10/2002 | White et al. | |
| 6,483,069 B2 | 11/2002 | Coleman et al. | |
| 6,554,920 B1 | 4/2003 | Jackson et al. | |
| 6,609,894 B2 | 8/2003 | Jackson et al. | |
| 6,709,766 B2 | 3/2004 | Coleman et al. | |
| 6,872,912 B1 | 3/2005 | Wos et al. | |
| 7,278,315 B1 | 10/2007 | Klein et al. | |
| 7,874,472 B2 | 1/2011 | Lee et al. | |
| 8,413,877 B2 | 4/2013 | Bischof et al. | |
| 8,442,665 B2 | 5/2013 | Krause et al. | |
| 2002/0170890 A1 | 11/2002 | Keicher et al. | |
| 2003/0029845 A1 | 2/2003 | Tamura et al. | |
| 2003/0075587 A1 | 4/2003 | Smashey et al. | |
| 2003/0170489 A1 | 9/2003 | Allen et al. | |
| 2003/0226878 A1 | 12/2003 | Shah et al. | |
| 2008/0028605 A1 | 2/2008 | Lutz et al. | |
| 2011/0226390 A1* | 9/2011 | Chen ...................... C22C 19/00 148/527 |

FOREIGN PATENT DOCUMENTS

| | | |
|---|---|---|
| JP | H0748667 A | 2/1995 |
| JP | 2001287602 A | 10/2001 |
| JP | 2003053533 A | 2/2003 |
| JP | 2007040303 A | 2/2007 |
| JP | 2011033023 A | 2/2011 |
| JP | 2011136344 A | 7/2011 |
| JP | 2011214541 A | 10/2011 |
| JP | 2011256795 A | 12/2011 |
| JP | 2011256795 A | 12/2011 |
| JP | 201220308 A | 2/2012 |
| JP | 2012020308 A | 2/2012 |
| JP | 2013086182 A | 5/2013 |
| KR | 20100018954 A | 2/2010 |
| KR | 20110067981 A | 6/2011 |
| KR | 20120138937 A | 12/2012 |

OTHER PUBLICATIONS

Office Action dated May 19, 2017 in corresponding Chinese Patent Appln. No. 201480059739.8 filed Sep. 16, 2014.
Office Action dated Dec. 12, 2017 in corresponding Chinese Patent Appln. No. 201480059739.8 filed Sep. 16, 2014.
European Extended Search Report dated Nov. 30, 2016, issued in the corresponding European Patent Application No. 14857589.7.

* cited by examiner

LASER POWDER DEPOSITION WELD REWORK FOR GAS TURBINE ENGINE NON-FUSION WELDABLE NICKEL CASTINGS

The present disclosure claims priority to U.S. Provisional Patent Disclosure Ser. No. 61/897,623, filed Oct. 30, 2013.

BACKGROUND

The present disclosure relates to a weld rework method and, more particularly, to a weld rework of a gas turbine engine component. The method described below may be used to fill up a cavity resulted from removing a defect found in the metal during original equipment manufacturing or during overhaul and repair services.

A gas turbine engine utilizes various relatively large, complex components that are cast from a high temperature Nickel alloy. An example of such a component is the Mid Turbine Frame (MTF). The MTF includes a plurality of hollow vanes arranged in a ring-vane-ring structure in which the rings define inner and outer boundaries of a core combustion gas path while the vanes are disposed across the gas path. Tie rods often extend through the hollow vanes to interconnect an engine mount ring and a bearing compartment.

Casting components such as the MTF hollow vanes may result in flaws that are rework welded as part of the normal manufacture process. Various methods of rework with a filler alloy equivalent to that of the parent component non-fusion weldable base alloy, although effective, are relatively slow and expensive. In one rework example, a half-inch (13 mm) sized defect requires upward of ten hours to rework.

Alternate methods of rework welding utilize an alternate filler alloy which is more weldable to facilitate a relatively quicker weld rework, but such an approach may face the cracking issue at the substrate alloy. The filler alloy may not be fully compatible with the material properties of the substrate alloy such as oxidation resistance or not be compatible with coatings and may shorten component service life. Further, removal of casting defects may be complicated through formation of a through hole therefrom.

SUMMARY

A method of reworking or repairing a component according to one disclosed non-limiting embodiment of the present disclosure includes removing a defect from a component manufactured of a non-fusion weldable base alloy to form a cavity that results in a through hole; sealing the through hole with a backing; and at least partially filling the cavity with a multiple of layers of a multiple of laser powder deposition spots, each of the multiple of laser powder deposition spots formed of a filler alloy, a first layer of the multiple of layers includes a perimeter of the multiple of laser powder deposition spots that at least partially overlap a wall of the cavity and the backing.

A further embodiment of the present disclosure includes, wherein the first layer of the multiple of layers forms a complete perimeter formed prior to any other layers.

A further embodiment of any of the foregoing embodiments of the present disclosure includes, forming a desired surface roughness on the backing.

A further embodiment of any of the foregoing embodiments of the present disclosure includes, wherein the desired surface roughness on the backing is about equal to the wall of the cavity or is sufficient to not causing notably different laser energy absorption between the backing and the wall of the cavity.

A further embodiment of any of the foregoing embodiments of the present disclosure includes, wherein the each spot in a layer is located between two spots from a prior layer, A further embodiment of any of the foregoing embodiments of the present disclosure includes, wherein the desired surface roughness on the backing is at least about 125 micro inches (0.003 mm).

A further embodiment of any of the foregoing embodiments of the present disclosure includes, wherein the thickness of the backing is between about 0.010 to 0.020 inches (0.254-0.508 mm).

A further embodiment of any of the foregoing embodiments of the present disclosure includes, wherein the filler alloy is a fusion weldable powder material.

A further embodiment of any of the foregoing embodiments of the present disclosure includes, wherein the non-fusion weldable base alloy is a high gamma prime nickel based alloy.

A method of reworking a component according to another disclosed non-limiting embodiment of the present disclosure includes removing a defect from a component manufactured of a non-fusion weldable base alloy to form a cavity that results in a through hole; forming a desired surface roughness on a backing; sealing the through hole with the backing; and at least partially filling the cavity with a multiple of layers of a multiple of laser powder deposition spots, each of the multiple of laser powder deposition spots formed of a filler alloy.

A further embodiment of any of the foregoing embodiments of the present disclosure includes, completely sealing the backing along the wall of the cavity and the backing.

A further embodiment of any of the foregoing embodiments of the present disclosure includes, wherein a first layer of the multiple of layers includes a perimeter of the multiple of laser powder deposition spots that overlap a wall of the cavity and the backing.

A further embodiment of any of the foregoing embodiments of the present disclosure includes, wherein the first layer of the multiple of layers forms a complete perimeter around an interface between the backing and the wall.

A further embodiment of any of the foregoing embodiments of the present disclosure includes, wherein the desired surface roughness on the backing is about equal to the wall of the cavity or is sufficient to not causing notably different laser energy absorption between the backing and the wall of the cavity.

A further embodiment of any of the foregoing embodiments of the present disclosure includes, wherein the each spot in a layer is located between two spots from a prior layer.

A further embodiment of any of the foregoing embodiments of the present disclosure includes, wherein the desired surface roughness on the backing is at least about 125 micro inches (0.003 mm).

A further embodiment of any of the foregoing embodiments of the present disclosure includes, wherein the thickness of the backing is between about 0.010 to 0.020 inches (0.254-0.508 mm).

A cast component for a gas turbine engine according to another disclosed non-limiting embodiment of the present disclosure includes a cast component manufactured of non-fusion weldable base alloy with a cavity at least partially filled with a multiple of layers of a multiple of laser powder deposition spots, each of the multiple of laser powder deposition spots formed of a filler alloy, at least one layer of the multiple of layers includes a perimeter of the multiple of laser powder deposition spots that overlap at between the wall of the cavity and the backing.

A further embodiment of any of the foregoing embodiments of the present disclosure includes wherein the non-fusion weldable base alloy is a high gamma prime nickel based alloy.

A further embodiment of any of the foregoing embodiments of the present disclosure includes, wherein the each spot in a layer is located between two spots from a prior layer, The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
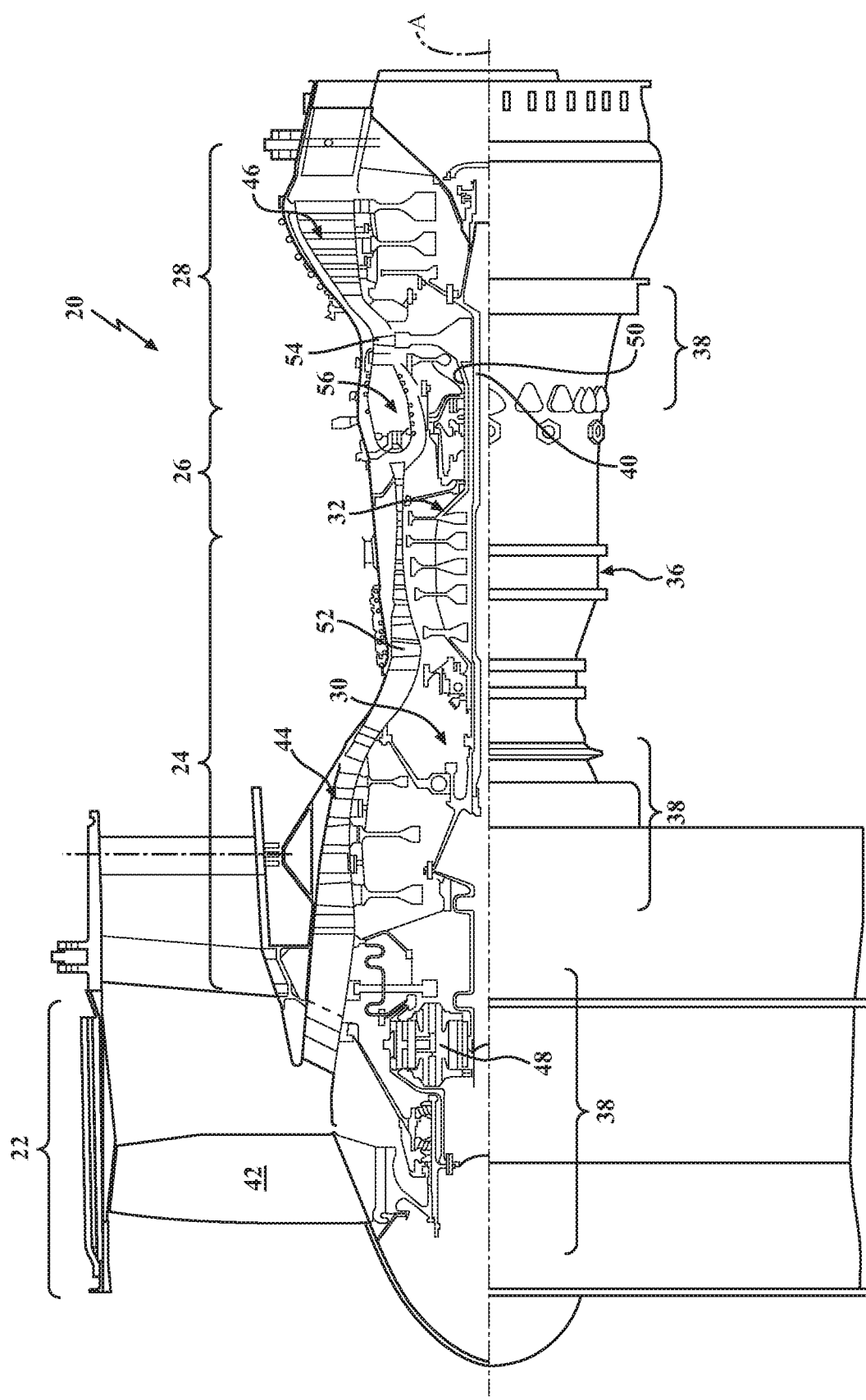
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, three-spool (plus fan) turbofans with an intermediate spool as well as industrial gas turbines.

The engine 20 generally includes a low spool 30 and a high spool 32 mounted for rotation about an engine central longitudinal axis A relative to an engine case assembly 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing structures 38 within the engine case assembly 36.

Figure 2:
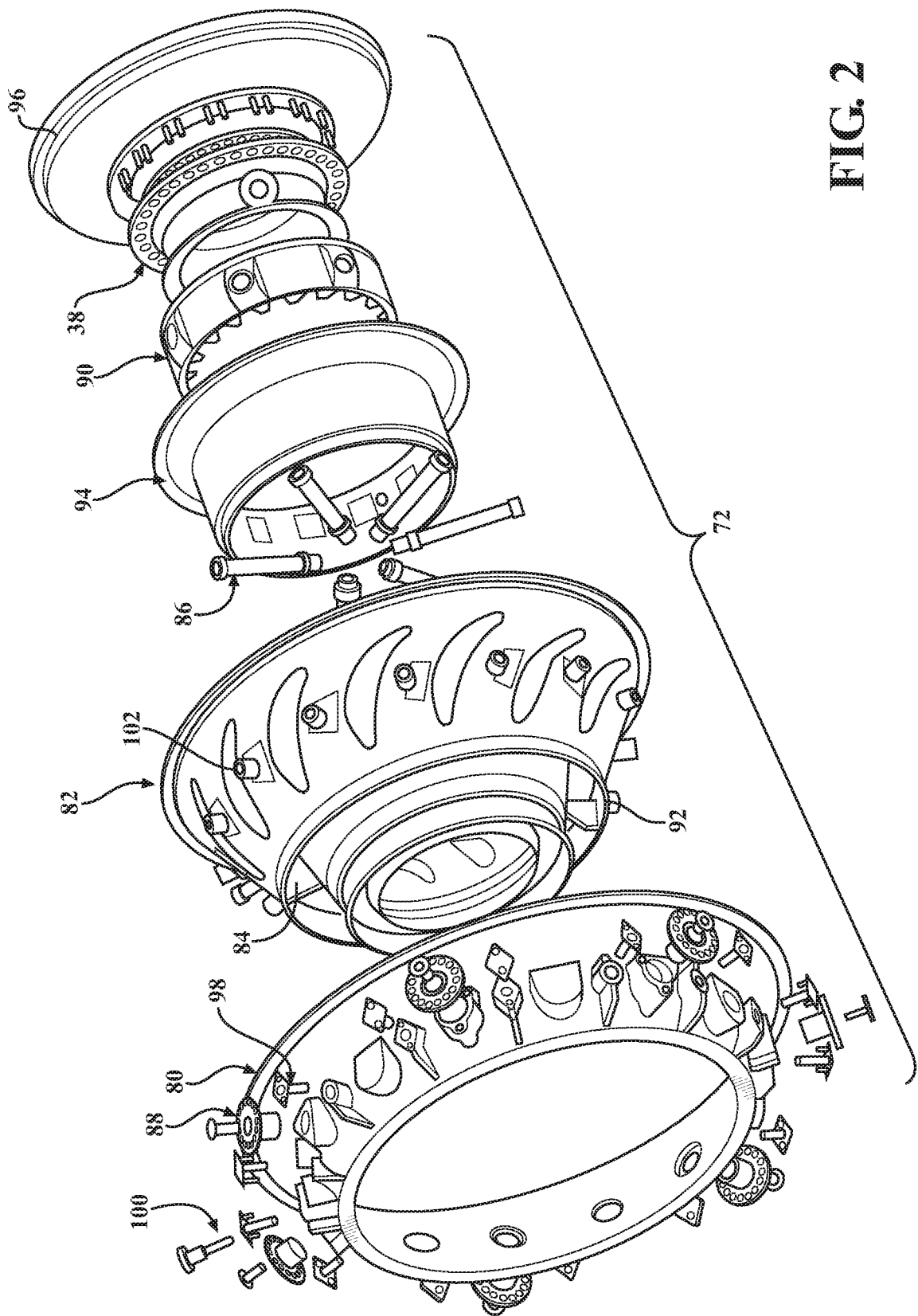
FIG. 2 is an exploded view of a Mid-Turbine Frame module.

The engine case assembly 36 may include a plurality of modules, such as a a mid-turbine frame (MTF) module 72 (FIG. 2). It should be understood that additional or alternative modules might be utilized to form the engine case assembly 36

With reference to FIG. 2, the MTF module 72 generally includes an outer turbine case 80, a mid-turbine frame (MTF) 82 which defines a plurality of hollow vanes 84, a plurality of tie rods 86, a multiple of tie rod nuts 88, an inner case 90, a HPT seal 92, a heat shield 94, a LPT seal 96, a multiple of centering pins 98 and a borescope plug assembly 100. The MTF module 72 supports a compartment 38 through which the inner and outer shafts 40, 50 are rotationally supported. It should be appreciated that various other components may additionally or alternatively be provided within the MTF 82, for example only, the LPT seal 96 may alternatively be referred to as an intermediate seal in other engine architectures.

Each of the tie rods 86 are mounted to the inner case 90 and extend through a respective vanes 84 to be fastened to the outer turbine case 80 with the multiple of tie rod nuts 88.

That is, each tie rod 86 is typically sheathed by a vane 84 through which the tie rod 86 passes. The other vanes 84 may alternatively or additionally provide other service paths. The multiple of centering pins 98 are circumferentially distributed between the vanes 84 to engage bosses 102 on the MTF 82 to locate the MTF 82 with respect to the inner case 90 and the outer turbine case 80. It should be understood that various attachment arrangements may alternatively or additionally be utilized.

Figure 3:
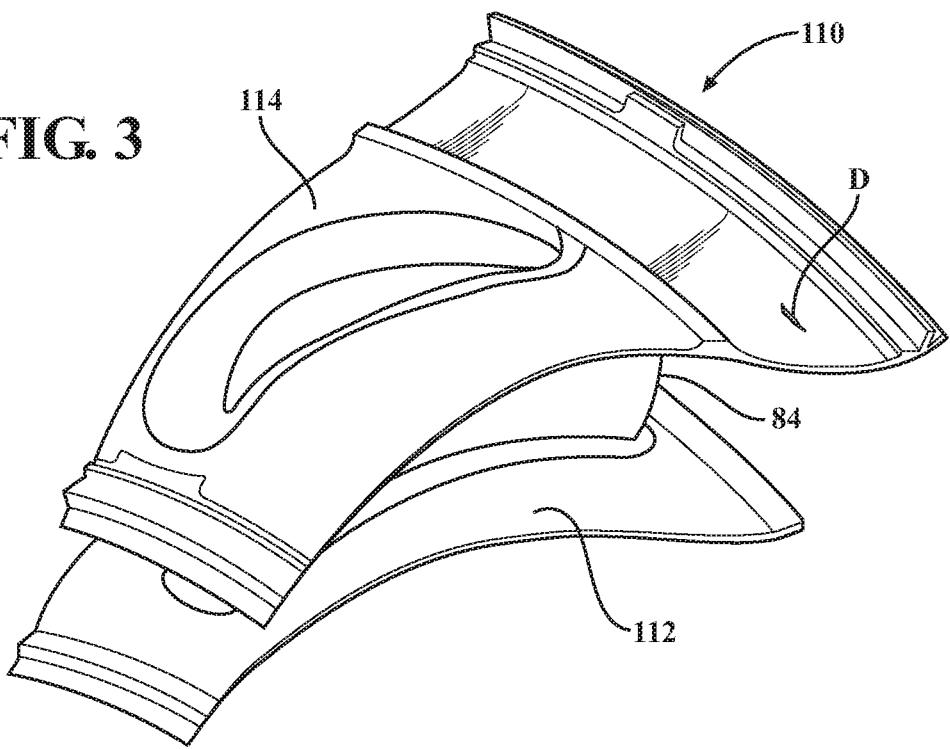
FIG. 3 is a perspective view of a Mid-Turbine Frame vane singlet as an example workpiece that has a casting defect.

With reference to FIG. 3, the MTF 82 in one disclosed non-limiting embodiment is manufactured of a multiple of cast singlets 110 (one shown). The multiple of singlets 110 are brazed together to define a ring-vane-ring configuration in which an inner platform 112 is spaced from an outer platform 114 by the multiple of vanes 84. Alternatively, the MTF 82 may be cast as a unitary component. The MTF 82 in this example is manufactured of a high gamma prime nickel based alloy such as MAR-M 247 polycrystalline cast nickel base superalloy. It should be appreciated that the MAR-M 247 polycrystalline cast nickel base superalloy is utilized in this example as the non-fusion weldable base alloy with the MTF 82 as the workpiece, however, other non-fusion weldable base alloys and other cast workpieces will also benefit herefrom.

Figure 4:
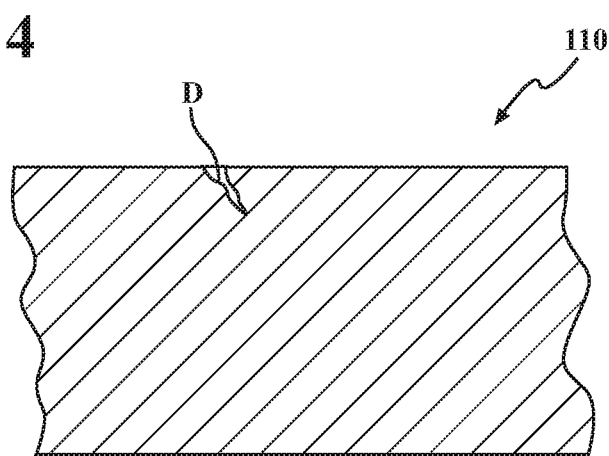
FIG. 4 is an expanded cross-sectional view of a casting defect in a cast component.

In some components, even under normal acceptable manufacture, the casting process may result in the formation of casting defects (illustrated schematically by area D; also shown in FIG. 4). Each casting defect is typically less than about 1 inch (25 mm) in size. It should be appreciated that various casting defect sizes and locations will benefit herefrom. Furthermore, various cast nickel based alloys may be reworked, repaired or remanufactured in accordance to the disclosed method.

Figure 5:
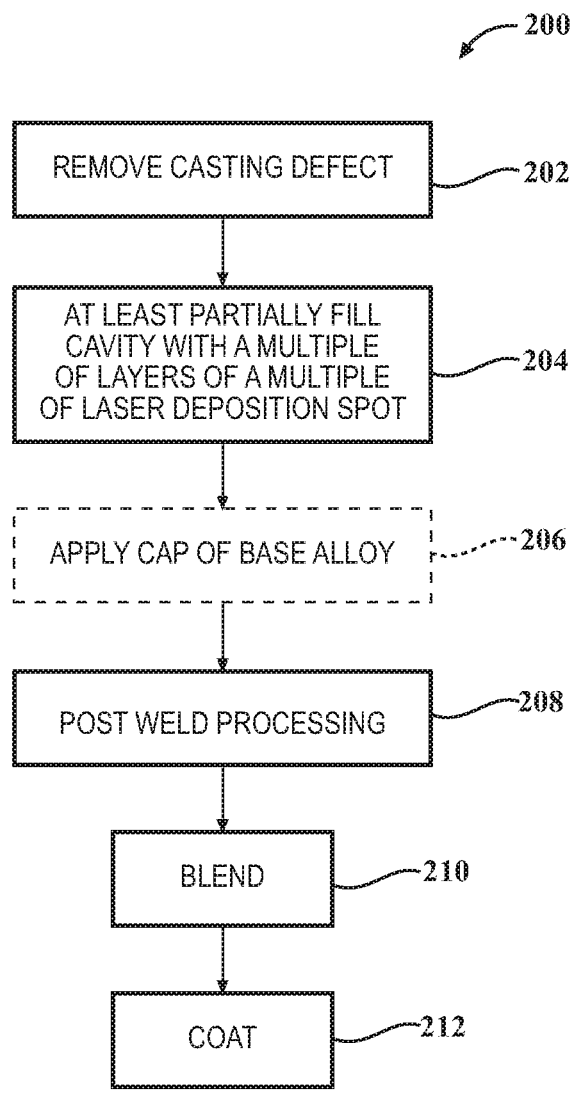
FIG. 5 is a flowchart illustrating a method to rework a cast component according to one disclosed non-limiting embodiment; non-fusion weldable base alloy.
Figure 6:
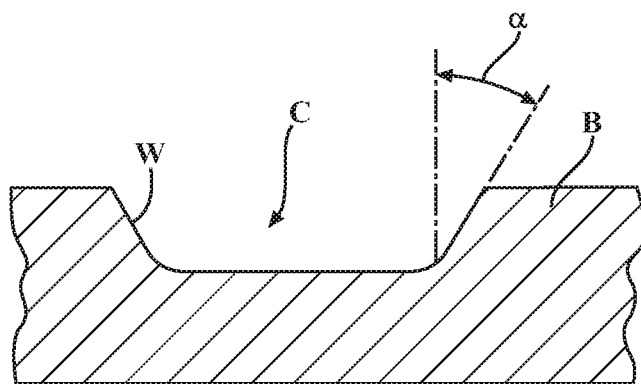
FIG. 6 is an expanded cross-sectional view of one step to rework a casting defect in the cast component.
Figure 7:
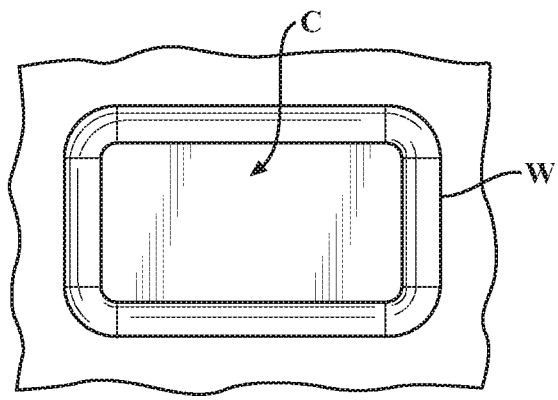
FIG. 7 is a top down view of a cavity formed to remove the casting defect.

With reference to FIG. 5, one disclosed non-limiting embodiment of a rework method 200 initially includes removal of the casting defect D (FIG. 4) such as through machining, grinding or other operation (step 202; FIGS. 6 and 7). Removal of the casting defect D forms a cavity C. Removal of the casting defect D may be performed to form a wall W around the periphery of the cavity C at a specific inclined angle α. In one example, the inclined angle may be about 30 to 75 degrees. It should be appreciated that the cavity C may define a circular, rectilinear (FIG. 8) or other periphery.

Figure 8:
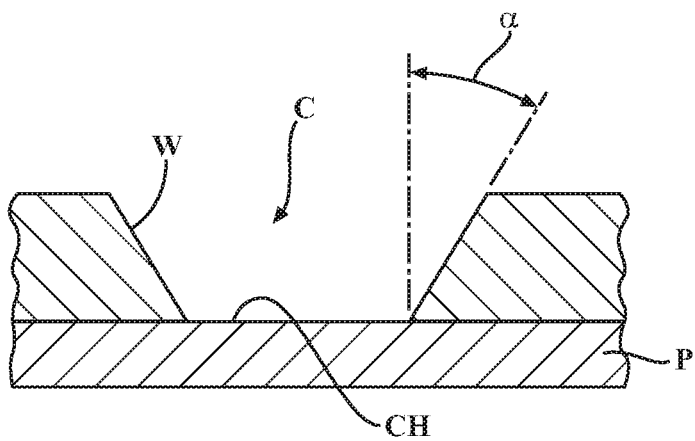
FIG. 8 is an expanded cross-sectional view of one step to rework a casting defect in the cast component according to another disclosed non-limiting embodiment.

In another disclosed non-limiting embodiment, removal of a casting defect may result in a through hole CH (FIG. 8). Again, an inclined angle of the wall W that surrounds the cavity C may define an inclined angle and is typically between about 30 and 75 degrees.

A backing P such as a metal sheet closes the through hole CH (FIG. 8). The thickness of the backing is typically from 0.010 inches to 0.020 inches and can be about as thin as about 0.003 inches (0.08 mm) and temporarily mechanically attached to the workpiece such as by a clamp. The backing P is removed after the rework.

Figure 9:
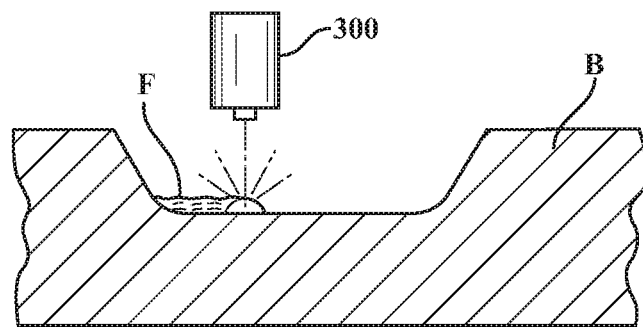
FIG. 9 is an expanded cross-sectional view illustrating one step of a filler alloy being formed in the cavity to rework a casting defect in the cast component.
Figure 10:
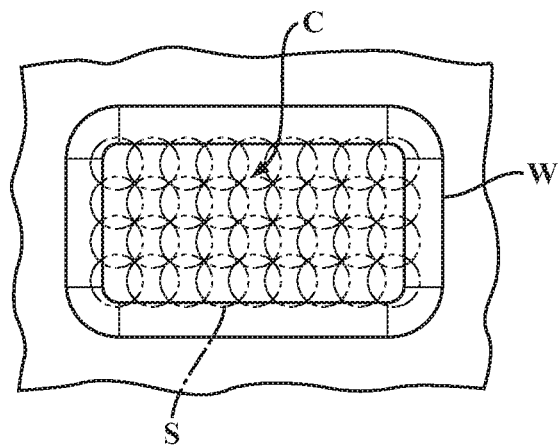
FIG. 10 is a top down view of a cavity illustrating one layer of a multiple of laser powder deposition spots of a filler alloy being formed in the cavity.

Next, a laser powder deposition system 300 (illustrated schematically; FIG. 9) is utilized to deposit a filler alloy F of an alloy powder as discrete laser powder deposition spots S in the cavity C (FIG. 10). The metal powder may be an alloy with a matched composition or under-matched composition to include, but not be limited to, Hastelloy X, PWA 795, MERL 72, Alloy 625 and others.

Laser powder deposition processes are methods with which metal powder is injected into the focused beam of a high-power laser under controlled atmospheric conditions. The focused laser beam melts the surface of the target material and generates a small molten pool of base material. Powder delivered into this same spot S is absorbed into the melt pool, thus generating a spot S that may, for example, range from about 0.005 to 0.040 inch (0.127 mm-1 mm) thick and 0.020 to 0.160 inch (0.5 mm-4.1 mm) in diameter. A typical laser spot size is about 0.016 inch (0.4 mm) thick and 0.050 inch (1.2 mm) in diameter. The use of the method described herein facilitates the deposition of metal onto non-fusion weldable base metal without cracking due to the minimum laser energy used. In one disclosed non-limiting embodiment the laser powder deposition system 300 is mounted to an automated end effector adapted to direct the focused laser beam and metal powder injection in a known orientation relative to the surface of the workpiece. It should be appreciated that the automated end effector, the workpiece, or both can be tilted or otherwise adjusted during the process to obtain a desired laser incident angle so that the laser energy can be effectively absorbed.

It should also be noted that the angle illustrated in FIG. 6 and FIG. 8 are the inclined angle of the wall and should not be confused with the laser incident angle. The inclined angle of the wall may be determined based on the following two criteria. First, the laser incident angle must be 30 degree or greater. The laser incident angle is defined as the angle between the laser beam and the localized surface with which the laser beam interacts. When the laser head is located directly above the backing P with the laser head movement parallel to the flat bottom of the backing P as illustrated on FIG. 6 or FIG. 8, the laser incident angle is 90 degree to the flat bottom of the backing P and the laser incident angle at the wall of the cavity is exactly the same as the inclined angle illustrated in FIG. 6 or FIG. 8. If the laser head is tilted such that the laser beam is not exactly 90 degree to the flat bottom of the backing P, the laser incident angle would be different from the angle illustrated in FIG. 6 or FIG. 8. If the laser incident angle is below 30 degree, too much laser energy may be reflected away and result in lack of fusion due to not sufficient energy absorbed by the metal. Second, if the inclined angle illustrated in FIG. 6 or FIG. 8 is above 75 degree, the laser incident angle would be above 30 degree, which is acceptable to achieve defect free laser weld deposits. However, the opening of the cavity may not be economically practical from a cost of rework processing standpoint. It should be noted that the laser incident angle at the area of flat bottom of the backing P is typically close to 90 degree and it is acceptable.

The cavity C is filled with a multiple of layers of a multiple of laser powder deposition spots S applied with the laser powder deposition system 300 generally at room temperature. In one example, each laser powder spot S overlays the adjacent laser powder deposition spots S by about 50%. That is, the multiple of laser powder deposition spots S in each layer form a matrix of overlapping laser powder deposition spots S. The outer most laser powder deposition spots S are located at least partially on the wall W. That is, the inclined angle of the wall W permits each layer to at least partially overlap the wall W as well as permit the laser from the laser powder deposition system 300 direct access into the cavity C. It should be appreciated that the inclined angle may be at least partially adjusted by adjusting the angle of incidence of the laser beam to the workpiece. In one disclosed non-limiting embodiment the laser powder deposition system 300 is mounted to an automated end effector adapted to direct the focused laser beam and metal powder injection in a known orientation relative to the surface of the workpiece. It should be appreciated that the automated end effector, the workpiece, or both can be tilted or otherwise adjusted during the process to obtain a desired laser incident angle, however, even if the angle is changed during the process, an angle greater than about 30 degree is required for the laser energy to be effectively absorbed.

Figure 11:
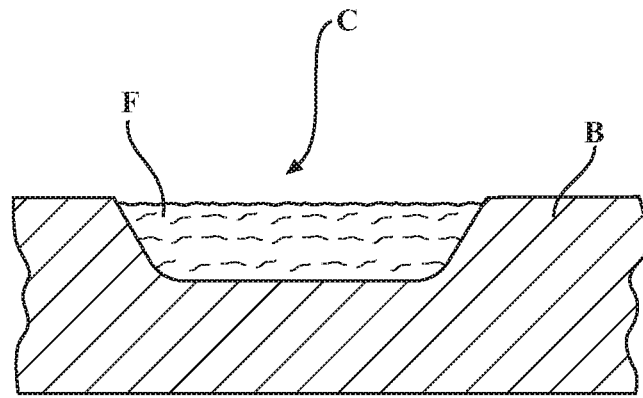
FIG. 11 is an expanded cross-sectional view of a filler alloy application step to rework a casting defect in the cast component.

Additional layers of laser powder deposition spots S are progressively applied to at least partially fill the cavity C (FIG. 11). That is, although each spot S is generally equivalent, a greater number of laser powder deposition spots are typically applied in each layer so as to fill the cavity C. When each subsequent layer of the laser powder deposition spots S is applied, the laser head height may also be adjusted to ensure that the laser to layer distance is maintained generally constant so that the laser power and powder quantity per spot S is generally maintained constant.

The deposition of discrete laser spots rather than a continuous laser beam, and the placement of each laser spot facilitates the filling of the cavity C that may be of an irregular shape without the need of programming the movement of the laser beam to follow the shape of the cavity as well as avoids the potential for cracking from weld deposition.

To accommodate the different cavity size to be filled, the laser machine operator only has to change the number of laser spot deposited. For example, a command for the laser machine to fill a 14 by 14 spot matrix (a total of 196 spots) would fill a cavity about twice as large as the cavity filled by a 10 by 10 spot matrix (a total of 100 spots). To accommodate the different geometry of the cavity, the laser machine operator need only change the number of laser spot at each direction. For example, the 10 by 15 spot matrix would fill a rectangular cavity with the long side about double the length of the short side. It should be noted that the shape of a cavity is typically irregular, not exactly square or rectangular. The deposition of a rectangular pattern may result in additional spots deposited. This is acceptable as the deposition of extra metal can always be blended away at the completion of deposition. The method described here is very important as casting defect geometries are always irregular. Programming of a laser beam to follow an irregular shape each time would make the cost of the rework process so high that it becomes uneconomical.

In one disclosed non-limiting embodiment, each laser spot is positioned between two spots of the prior layer. With this manner of laser spot placement, an even build-up height can be achieved and the potential lack of fusion between two laser spots can be further avoided.

In one specific disclosed non-limiting embodiment, a cavity C in a MTF 82 workpiece manufactured of a non-fusion weldable base alloy B of MAR-M 247 polycrystalline cast nickel base superalloy is filled with a filler alloy F of PWA 795. That is, the non-fusion weldable base alloy of the workpiece is of one material while the filler alloy F is of a different material.

Once the cavity C is filled or at least partially filled with a multiple of layers of the multiple of laser powder deposition spots S, the filler alloy F may be post weld processed (step 208). Examples of post weld processing include, but are not limited to, solution heat treatment plus aging heat treatment, stress relief heat treatment, hot isostatic pressing, stress relief by mechanical methods, and/or others.

Figure 12:
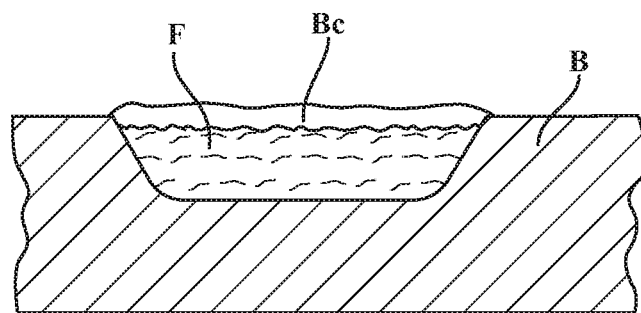
FIG. 12 is an expanded cross-sectional view of a non-fusion weldable base alloy cap one step to rework a casting defect in the cast component; non-fusion weldable base alloy

If an application requires the use of a matching alloy at the surface to meet a required material property, an optional layer of non-fusion weldable base alloy BC may optionally be applied at least partially within the cavity C and over the filler alloy F (step 206; FIG. 12). That is, the non-fusion weldable base alloy B of the workpiece is utilized to cover or cap the cavity C that is primarily filled with the filler alloy F. In this example, the cap of non-fusion weldable base alloy BC is MAR-M 247 that is electro-spark deposited to completely fill the cavity C. In this example, the cap of non-fusion weldable base alloy BC may be about 0.010 inches (0.25 mm) thick. It should be appreciated that the cap of non-fusion weldable base alloy BC is not always necessary.

Electro-spark deposition may also be referred to as "spark hardening", "electrospark toughening" or "electrospark alloying. It should be appreciated that other techniques may be utilized as, since only a relatively thin cap of non-fusion weldable base alloy BC is applied, a relatively slow technique is still readily utilized. That is, a technique that may otherwise be too slow and expensive to fill the entire cavity C, is readily utilized to form the thin cap of non-fusion weldable base alloy B.

Figure 13:
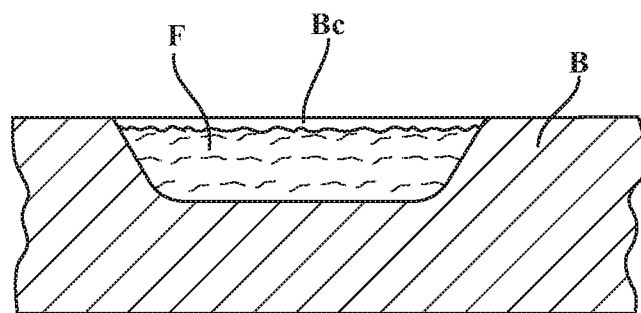
FIG. 13 is an expanded cross-sectional view of a blending step to rework a casting defect in the cast component.

Next, the cap of non-fusion weldable base alloy BC may be blended into the workpiece to form a desired profile (step 210; FIG. 13). That is, the cap of non-fusion weldable base alloy BC results in continuous surface of the common non-fusion weldable base alloy B over the cavity C.

Figure 14:
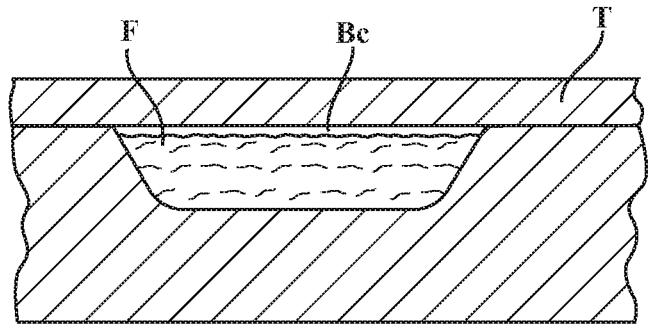
FIG. 14 is an expanded cross-sectional view of a coating step to rework a casting defect in the cast component.

Finally, as the cap of non-fusion weldable base alloy BC provides the contiguous surface, the workpiece is readily coated with a coating T (FIG. 14). That is, the cap of non-fusion weldable base alloy BC is fully compatible with an oxidation, thermal barrier or other coating T tailored to the non-fusion weldable base alloy BC such that full benefit thereof is received.

Figure 15:
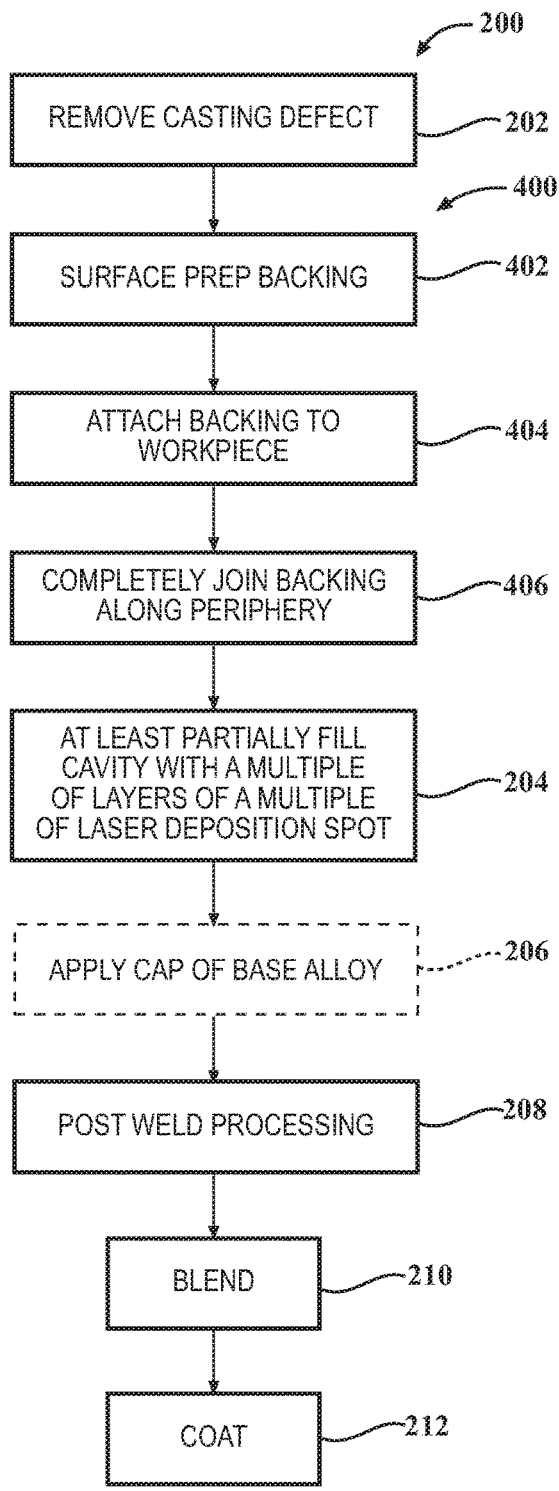
FIG. 15 is a flowchart illustrating a method to rework a cast component according to another disclosed non-limiting embodiment.

With reference to FIG. 15, in another disclosed non-limiting embodiment, removal of the casting defect may result in the through hole CH (FIG. 8) in which a periphery attachment method (400) is performed between steps 202 and 204 (FIG. 5) to minimize or avoid any localized separation between the backing P and the wall W during deposition of laser spots due to weld shrinkage. (FIG. 8).

The backing P may be of a pure Nickel or a Nickel based alloy material. The thickness of the backing P in this disclosed non-limiting embodiment is between about 0.010 to 0.020 inches (0.254-0.508 mm). More specifically, for opening size of the defects of about 0.25 inches (6.35 mm) and below, a backing P of about 0.010 inches (0.254 mm) thick may be preferred, while for defects of about 0.5 inches (12.7 mm) or greater, a backing P of about 0.020 inches (0.0508 mm) may be preferred to, for example, facilitate thermal control. Alternatively, it should be appreciated that the backing P may be of a thickness greater than 0.020 inches as long as intimate contact with the casting at the periphery of the defect is maintained.

The backing P is further processed to provide a desired surface roughness such as through grit blasting, sanding or other surface preparation to provide an appropriate reflective surface for the laser (Step 402; FIG. 15). A purpose of providing a desired surface roughness is to avoid the backing P absorbing less laser beam energy due to reflection of laser beam that may result in lack of fusion between the backing P and the wall W. In this disclosed non-limiting embodiment the surface roughness of the backing P is at least about 125 micro inches (0.003 mm). A surface roughness of about 125 micro inches (0.003 mm) is typically about equal to the surface roughness of the wall W from removal of the casting defect (Step 202; FIG. 5) or is sufficient to not causing notably different laser energy absorption between the backing and the wall of the cavity.

Subsequent to removal of the casting defect (Step 202; FIG. 5), the surface prepared backing P is temporarily mechanically attached to the workpiece (Step 404; FIG. 15). The inclined angle of the wall W that surrounds the cavity C may define an inclined angle within about 30 to 75 degrees while the backing P closes the through hole CH (FIG. 8).

Figure 16:
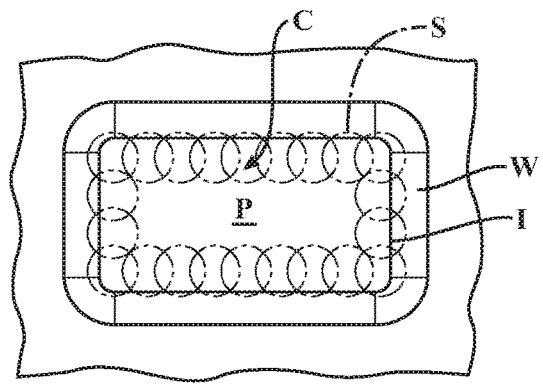
FIG. 16 is a top down view of a cavity formed to remove the casting defect.

Next, the laser powder deposition system 300 (illustrated schematically; FIG. 9) is utilized to deposit the filler alloy F of an alloy powder as discrete laser powder deposition spots S located around the periphery of the cavity C to join the backing P with the wall W (Step 406; FIG. 15). The discrete laser powder deposition spots S are each centered along the interface I between the backing P with the wall W with the desired spot overlap. That is, the discrete laser powder deposition spots S are formed to first define a complete periphery around the cavity C FIG. 16). It should be appreciated that the periphery, although illustrated to have particular geometry, may be of various geometries.

The complete joining at periphery around the cavity C ensures intimate contact between the backing P and the wall W to minimize or eliminate any localized separation between the backing P and the wall W during the subsequent deposition of laser spots due to thermal distortion and facilitate a crack-free weld rework.

The method reduces typical repair time down from several hours to but several minutes. This reduces the overall cost to cast components of high gamma prime nickel based alloy such as MAR-M 247 polycrystalline cast nickel base superalloy as well as the repair and remanufacture of other nickel alloy castings.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of reworking a component, comprising:
   removing a defect from a component manufactured of a non-fusion weldable base alloy to form a cavity that results in a through hole;
   sealing the through hole with a backing; and
   at least partially filling the cavity with a multiple of layers of a multiple of laser powder deposition spots, each of the multiple of laser powder deposition spots formed of a filler alloy, a first layer of the multiple of layers includes a perimeter of the multiple of laser powder deposition spots that at least partially overlap a wall of the cavity and the backing.

2. The method as recited in claim 1, wherein the first layer of the multiple of layers forms a complete perimeter formed prior to any other layers.

3. The method as recited in claim 2, further comprising forming a desired surface roughness on the backing.

4. The method as recited in claim 3, wherein the desired surface roughness on the backing provides about equal laser energy absorption between the backing and the wall.

5. The method as recited in claim 3, wherein the desired surface roughness on the backing is at least about 125 micro inches (0.003 mm).

6. The method as recited in claim 3, wherein the backing is between about 0.010 to 0.020 inches (0.254-0.508 mm).

7. The method as recited in claim 3, wherein the backing is between about 0.010 to 0.020 inches (0.254-0.508 mm).

8. The method as recited in claim 1, wherein the each spot in a layer is located between two spots from a prior layer.

9. The method as recited in claim 1, wherein the filler alloy is a fusion weldable powder material.

10. The method as recited in claim 9, wherein the non-fusion weldable base alloy is a high gamma prime nickel based alloy.

11. A method of reworking a component, comprising:
    removing a defect from a component manufactured of a non-fusion weldable base alloy to form a cavity that results in a through hole;
    forming a desired surface roughness on a backing;
    sealing the through hole with the backing; and
    at least partially filling the cavity with a multiple of layers of a multiple of laser powder deposition spots, each of the multiple of laser powder deposition spots formed of a filler alloy.

12. The method as recited in claim 11, further comprising completely sealing the backing along a wall of the cavity and the backing.

13. The method as recited in claim 11, wherein a first layer of the multiple of layers includes a perimeter of the multiple of laser powder deposition spots that overlap a wall of the cavity and the backing.

14. The method as recited in claim 13, wherein the first layer of the multiple of layers forms a complete perimeter around an interface between the backing and the wall.

15. The method as recited in claim 11, wherein the desired surface roughness on the backing provides about equal laser energy absorption between the backing and the wall.

16. The method as recited in claim 11, wherein the each spot in a layer is located between two spots from a prior layer.

17. The method as recited in claim 11, wherein the desired surface roughness on the backing is at least about 125 micro inches (0.003 mm).

* * * * *